United States Patent
Empacher et al.

(10) Patent No.: US 9,429,093 B2
(45) Date of Patent: Aug. 30, 2016

(54) METHOD FOR OPERATING A FUEL INJECTION SYSTEM

(71) Applicants: Lars Empacher, Kornwestheim (DE); Rene Zieher, Edingen-Neckarhausen (DE); Stephan Olbrich, Stuttgart (DE); Michael Schenk, Ludwigsburg (DE)

(72) Inventors: Lars Empacher, Kornwestheim (DE); Rene Zieher, Edingen-Neckarhausen (DE); Stephan Olbrich, Stuttgart (DE); Michael Schenk, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 346 days.

(21) Appl. No.: 14/046,574

(22) Filed: Oct. 4, 2013

(65) Prior Publication Data

US 2014/0100761 A1  Apr. 10, 2014

(30) Foreign Application Priority Data

Oct. 5, 2012 (DE) .......... 10 2012 218 176

(51) Int. Cl.
| | |
|---|---|
| F02D 41/22 | (2006.01) |
| F02D 41/30 | (2006.01) |
| F02D 41/24 | (2006.01) |
| F02D 41/40 | (2006.01) |

(52) U.S. Cl.
CPC .......... *F02D 41/30* (2013.01); *F02D 41/2467* (2013.01); *F02D 41/402* (2013.01); *F02D 41/3076* (2013.01); *F02D 41/403* (2013.01); *F02D 2200/0602* (2013.01); *F02D 2200/0616* (2013.01); *Y02T 10/44* (2013.01)

(58) Field of Classification Search
CPC .. F02D 41/222; F02D 41/223; F02D 41/224; F02D 41/3836; F02D 41/2467; F02D 41/402; F02D 41/30; F02D 41/403; F02D 41/307; F02D 41/3076; F02D 41/3809; F02D 41/405; F02D 2041/223; F02D 2041/1433; F02D 2200/0602; F02D 2200/0616; F02D 2200/0604; F02M 63/023; F02M 63/025; F02M 63/028; F02M 65/001; F02M 65/003; F02M 2200/247
USPC ................. 73/114.51, 114.43; 123/447, 456, 123/198 D, 387, 457
See application file for complete search history.

(56) References Cited

U.S. PATENT DOCUMENTS

| | | | |
|---|---|---|---|
| 6,234,148 B1 * | 5/2001 | Hartke et al. ................. | 123/447 |
| 6,807,947 B2 * | 10/2004 | Coates et al. ................. | 123/490 |
| 2008/0228341 A1 * | 9/2008 | Orifij ............................. | 701/29 |
| 2009/0007647 A1 * | 1/2009 | Kraemer et al. ........... | 73/114.43 |
| 2009/0164102 A1 * | 6/2009 | Olbrich et al. ............... | 701/103 |
| 2009/0177366 A1 * | 7/2009 | Achleitner et al. .......... | 701/103 |
| 2010/0030454 A1 * | 2/2010 | Olbrich et al. ............... | 701/104 |

(Continued)

FOREIGN PATENT DOCUMENTS

DE  10 2008 043 592  5/2010

*Primary Examiner* — Lindsay Low
*Assistant Examiner* — George Jin
(74) *Attorney, Agent, or Firm* — Norton Rose Fulbright US LLP (57) ABSTRACT

A fuel injection system for an internal combustion engine in which pressurized fuel is made available in a pressure accumulator and a fuel pressure prevailing in the pressure accumulator is ascertained with the aid of a pressure sensor and in which the fuel enters a combustion chamber of the internal combustion engine through at least one fuel injection device. A slope of a curve, which links a pressure difference in the pressure accumulator during a fuel injection to an injected fuel quantity, is ascertained and the fuel pressure prevailing in the pressure accumulator is inferred from the slope.

12 Claims, 5 Drawing Sheets

(56) References Cited

U.S. PATENT DOCUMENTS

| | | | |
|---|---|---|---|
| 2010/0121600 A1* | 5/2010 | Zieher | 702/98 |
| 2010/0199951 A1* | 8/2010 | Cinpinski et al. | 123/456 |
| 2011/0016959 A1* | 1/2011 | Hermes et al. | 73/114.51 |
| 2011/0022290 A1* | 1/2011 | Kaneko et al. | 701/103 |
| 2011/0106409 A1* | 5/2011 | Walter et al. | 701/103 |
| 2011/0307161 A1* | 12/2011 | Sommerer et al. | 701/103 |
| 2011/0313639 A1* | 12/2011 | Hemmerlein et al. | 701/103 |
| 2012/0035833 A1* | 2/2012 | Melis et al. | 701/104 |
| 2012/0150417 A1* | 6/2012 | Massaro | 701/104 |
| 2012/0283934 A1* | 11/2012 | Topp et al. | 701/104 |
| 2013/0080032 A1* | 3/2013 | Kaneko et al. | 701/103 |
| 2014/0311453 A1* | 10/2014 | Christ et al. | 123/456 |
| 2014/0311457 A1* | 10/2014 | Christ et al. | 123/478 |
| 2015/0034048 A1* | 2/2015 | Walter et al. | 123/445 |

\* cited by examiner

METHOD FOR OPERATING A FUEL INJECTION SYSTEM

CROSS REFERENCE

The present application claims the benefit under 35 U.S.C. §119 of German Patent Application No. DE 102012218176.8 filed on Oct. 5, 2012, which is expressly incorporated herein by reference in its entirety.

FIELD

The present invention relates to a method for operating a fuel injection system, as well as to a control and/or regulating device, a computer program, and a storage medium.

BACKGROUND INFORMATION

In some conventional internal combustion engines, an operating state and/or values of variables important for the operation may be monitored with the aid of a so-called on board diagnosis. Among other things, a correctly set fuel pressure in a pressure accumulator of a fuel system of the internal combustion engine is important. The fuel pressure is frequently ascertained with the aid of a pressure sensor ("rail pressure sensor," RPS). In order to check or monitor the pressure sensor for proper functioning, it is, for example, possible to situate a second pressure sensor having the same design on the pressure accumulator and use it for a comparison. German Patent Application No. DE 10 2008 043 592 is an example of a patent publication from this field.

SUMMARY

Features which are used for the present invention are described below and are shown in the drawings; the features may be important for the present invention both alone and in different combinations without explicit reference being made again thereto.

An example method in accordance with the present invention may have the advantage that a fuel pressure in a pressure accumulator (fuel accumulator, rail) of a fuel system (fuel injection system) for an internal combustion engine may be concluded to be correct, without additional sensors or actuators, such as a pressure control valve, being necessary. In particular, a pressure sensor situated on a pressure accumulator may be checked or monitored for proper functioning. If necessary, devices or algorithms may also be used for the method in a control and/or regulating device for the internal combustion engine which ascertain dynamic pressure changes in the pressure accumulator which take place due to injections into the combustion chambers of the internal combustion engine. Moreover, the present invention is applicable comparably flexibly and adaptable to present fuel systems. The example method according to the present invention requires comparably little computation time and/or data storage space and may be carried out in a single one, in general any, combustion chamber (cylinder) of the internal combustion engine. In this way, harmful effects on the operation of the internal combustion engine (e.g., on a driving behavior of a motor vehicle) and/or on exhaust gas emissions may be reduced.

The present invention relates to a method for operating the fuel injection system for the internal combustion engine in which pressurized fuel is provided in the pressure accumulator and a fuel pressure prevailing in the pressure accumulator is ascertained with the aid of the pressure sensor, and in which the fuel enters a combustion chamber of the internal combustion engine through at least one fuel injection device (injector). In accordance with the present invention, a slope of a curve is ascertained which links a pressure difference in the pressure accumulator to an injected fuel quantity during a fuel injection. The slope is then used to infer the fuel pressure prevailing in the pressure accumulator. For this purpose, data values, which may be used to infer the fuel pressure prevailing in the pressure accumulator or proper functioning of the pressure sensor, may, for example, be ascertained during a test operation, and stored in a data memory of the control and/or regulating device. In this case, a plurality of values of the injected fuel quantity, the pressure difference, and the fuel pressure may be involved, other variables optionally being used and also stored as parameters, for example. This will be explained further below.

In particular, it may be provided that to ascertain the slope, the fuel quantity injected by the fuel injection device is preferably changed cyclically. In this way, a first fuel quantity is injected in a first step, and a second fuel quantity, which is different from the first fuel quantity, is injected in a second step. This may take place alternatingly from injection cycle to injection cycle, or the fuel quantity injected in each particular case may also remain constant over multiple sequential injection cycles. This describes a "stimulation" which is particularly advantageous for the method. Preferably, the fuel quantity injected in each case is not ascertained directly (by measurement), but indirectly, e.g., by using an activation period of an electromagnetic actuator of the fuel injection device. In this way, a so-called "desired quantity" of the control and/or regulating device is assumed for the injected fuel quantity which characterizes an instantaneous setpoint value of the fuel quantity to be injected.

It may be additionally provided that the injected fuel quantity is changed by a preferably cyclic change in the injection pattern. In this way, a particularly simple variation of the injected fuel quantity is enabled by cyclically switching over between preferably two injection patterns.

The effects on an operation of the internal combustion engine may be reduced when it is switched back and forth between a (first) injection pattern with a close pilot injection and a (second) injection pattern without a close pilot injection. For example, an operating noise of the internal combustion engine may be kept comparably low in this way.

Alternatively or additionally, it may be provided that it is switched back and forth between an injection pattern with a late post-injection and an injection pattern without a late post-injection. Preferably, a "torque-neutral" post-injection is used so that effects on a drive torque generated by the internal combustion engine are minimized.

Another embodiment of the method provides that in a coasting mode of the internal combustion engine, it is switched back and forth between an operating mode during which a comparably small injection quantity is injected, and an operating mode during which no injection takes place. By possibly using the coasting mode, the invention is applicable in a particularly variable and flexible manner.

Another embodiment of the method provides that the injection quantity at a single combustion chamber is changed for ascertaining the slope, and that a fuel quantity injected into the remaining combustion chambers of the internal combustion engine in each case is metered in such a way that a torque generated by the internal combustion engine is constant in the sum at least approximately. Preferably, this takes place in such a way that no or only a minor effect on the exhaust gas emission values of the internal combustion engine results at the same time. Therefore, the complexity for carrying out the method may remain particularly low, possibly disadvantageous effects on the operation of the internal combustion engine being minimized.

Additionally, it may be provided that a fuel temperature and/or a fuel type may also be considered when the pressure prevailing in the pressure accumulator is inferred from the slope. These variables may, for example, be used as parameters in the "connection" described in the following, whereby the accuracy of the method may be improved. Frequently, the fuel temperature and/or the fuel type is, however, not known in the control and/or regulating device, since these variables are comparably complex when it comes to being ascertained. Moreover, it may not be possible to infer the fuel temperature and/or the fuel type from the mentioned slope of the curve, since the fuel pressure and the pressure sensor are also checked according to the present invention. The method according to the present invention may work in principle independently of the fuel temperature and the fuel type. If these variables are known, however, for example by being measured, they may potentially further improve the accuracy of the method.

Furthermore, it may be provided that a connection is ascertained between the slope of the curve, which links the pressure difference in the pressure accumulator during a fuel injection to the injected fuel quantity, during a test operation (e.g., in a laboratory) and/or in a new condition of the internal combustion engine and/or in a new condition of the pressure sensor, and this connection is preferably stored in the form of equations, tables, characteristic curves, characteristic maps, and/or models. Thus, the example method includes a first method step in the test operation, and a second method step in a subsequent "normal" operation of the internal combustion engine, or of a motor vehicle driven by the internal combustion engine. During the test operation, a connection is ascertained from ascertained pressure differences of the fuel pressure in the pressure accumulator and the associated injection quantities in each case and the associated actually measured values of the fuel pressure. This connection includes, for example, a plurality of curves which quantify the pressure differences, the injection quantities, the fuel pressures, and the slope(s) resulting therefrom, which are stored in the data memory of the control and/or regulating device. During normal operation of the internal combustion engine, the particular slope is then ascertained from at least two value pairs of the pressure difference and the injected fuel quantity. This slope, and possibly also the pressure differences and the injection quantities, may be supplied as input variables to the connection stored in the data memory, and the associated fuel pressure in the pressure accumulator may be ascertained therefrom. The fuel pressure ascertained in this way is assumed to be comparably precise according to the method, since it was measured exactly and in real time during the above-described test operation. Subsequently, the fuel pressure ascertained from the connection may be compared to an instantaneously ascertained value of the pressure sensor, thus allowing the function of the pressure sensor situated on the pressure accumulator to be checked. A computing effort is in this case comparably small and additional elements, such as a second pressure sensor or a pressure control valve, are not necessary.

The accuracy of the method may be increased by a time averaging and/or a family averaging of the particular variables taking place when the method is carried out repeatedly in cycles. This concerns, for example, the ascertainment of the pressure difference in the pressure accumulator. Interferences with electrical signals or fluctuations of the fuel pressure due to possible pressure pulsations may thus be averaged in a simple and accurate manner.

The example method according to the present invention is preferably carried out with the aid of the control and/or regulating device for the internal combustion engine. This takes place in particular with little effort and cost-effectively with the aid of a computer program which is programmed accordingly to carry out the method.

BRIEF DESCRIPTION OF THE DRAWINGS

Exemplary specific embodiments of the present invention are explained below with reference to the figures.

DETAILED DESCRIPTION OF EXAMPLE EMBODIMENTS

The same reference numerals are used for functionally equivalent elements and variables in all figures, even in different specific embodiments.

Figure 1:
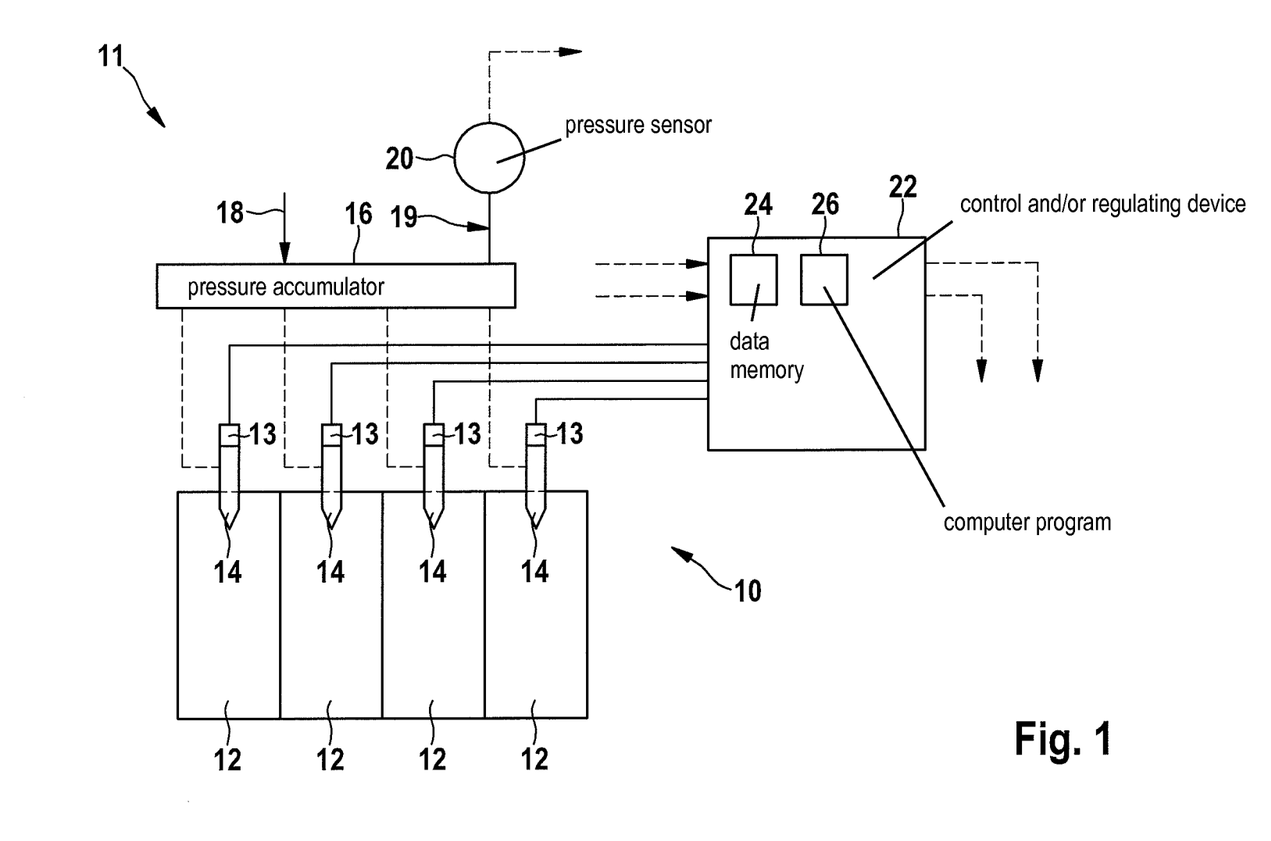
FIG. 1 shows a simplified schematic view of an internal combustion engine and a fuel system.

FIG. 1 shows a simplified schematic view of a fuel system 11 ("fuel injection system") for an internal combustion engine 10 in the present case having four combustion chambers 12 ("cylinders") and associated injectors 14 ("fuel injection systems") for injecting fuel. For example, internal combustion engine 10 is a gasoline engine or a diesel engine of a motor vehicle (not illustrated in the drawing). Injectors 14 may each be actuated by an electromagnetic actuator 13. Alternatively, electromagnetic actuator 13 may also be designed as a piezoelectric actuator 13.

In the figure, a pressure accumulator 16 (high-pressure accumulator, "rail") is illustrated above injectors 14, the pressure accumulator being supplied with fuel from a high-pressure line 18. A fuel pressure 19 ("rail pressure") in pressure accumulator 16 is monitored by a pressure sensor 20. In the right upper part of FIG. 1, a control and/or regulating device 22 together with indicated outgoing and incoming control lines is illustrated as well as a data memory 24 contained therein and a computer program 26.

During operation, a fuel pump (not illustrated) supplies pressure accumulator 16 via high-pressure line 18, pressure sensor 20 communicating instantaneous fuel pressure 19 to control and/or regulating device 22 via an indicated signal line. Four injectors 14 inject a certain fuel quantity 40 (see FIG. 3) into combustion chambers 12 as a function of an activation signal of electromagnetic actuator 13.

Figure 2:
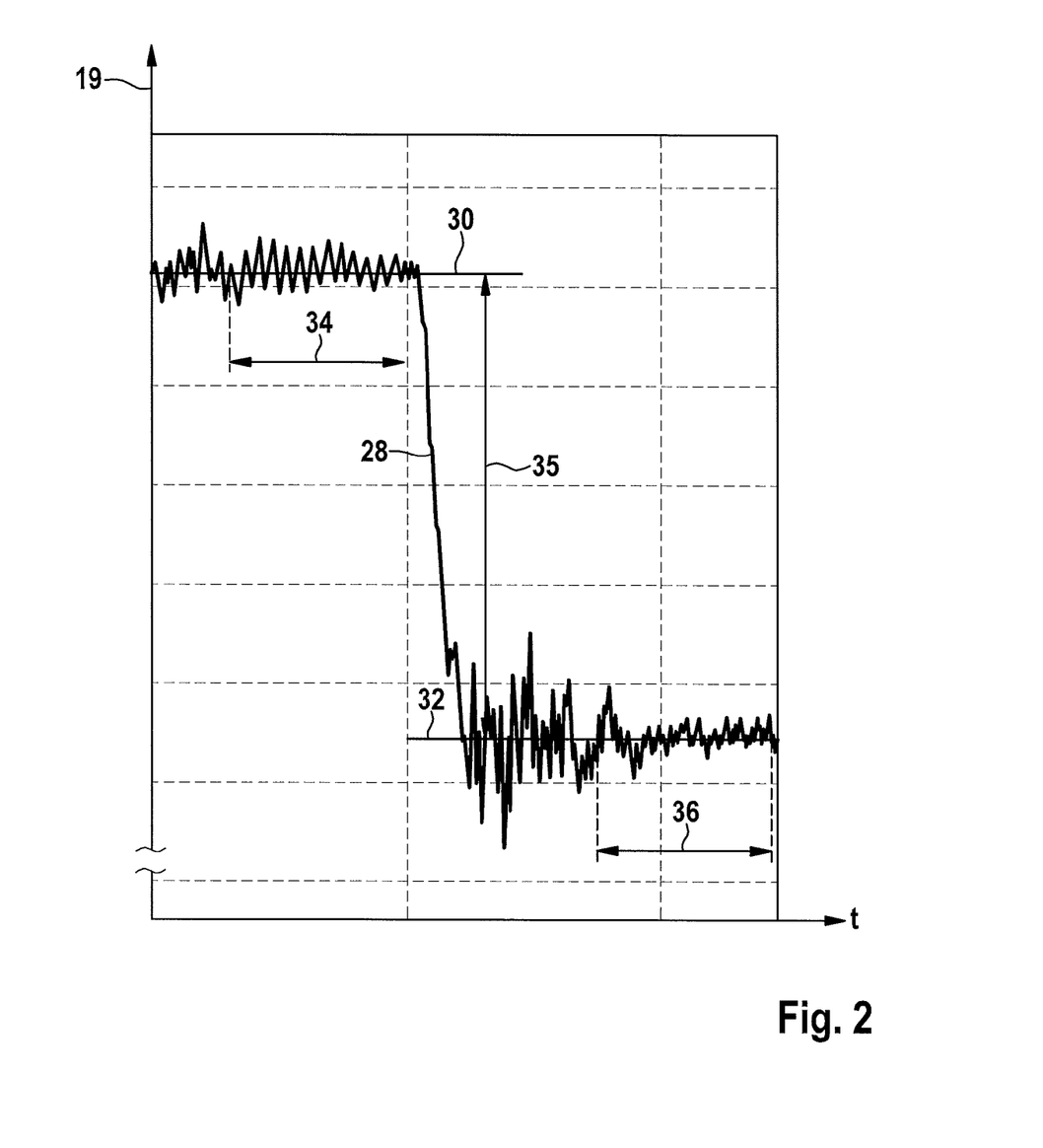
FIG. 2 shows a time diagram having a fuel pressure in a pressure accumulator of the fuel system.

FIG. 2 shows a time diagram having fuel pressure 19 in pressure accumulator 16 against a time t. An illustrated time curve 28 of fuel pressure 19 has a generally constant, first averaged value 30 in the left-hand area of the drawing and an essentially constant, second averaged value 32 in a right-hand area of the drawing.

In a horizontal central area of the figure, time curve 28 has an abrupt drop from first averaged value 30 to second averaged value 32. A pressure difference 35 which characterizes the abrupt drop may be ascertained from the two averaged values 30 and 32. Pressure difference 35 is in this case generally proportional to injected fuel quantity 40 and is also generally proportional to an activation period of electromagnetic actuator 13 or fuel pressure 19.

First averaged value 30 is averaged over a first time interval 34 (evaluation window), and second averaged value 32 is averaged over a second time interval 36 (evaluation window). A chronological position and duration of the particular averaged values 30 and 32 are preferably predefined as a function of interferences potentially superimposed on time curve 28, as is the case here.

Figure 3:
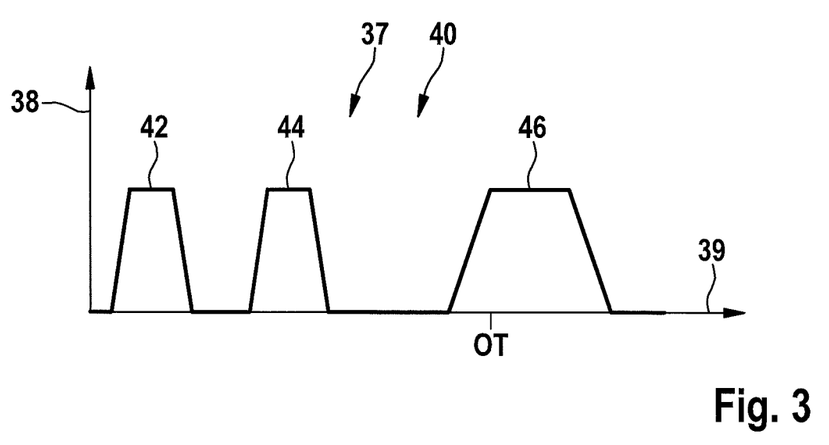
FIG. 3 shows a first fuel injection pattern.

FIG. 3 schematically shows a first injection pattern 37 of fuel into one of combustion chambers 12 of internal combustion engine 10. An injection rate 38 (ordinate) is illustrated against a crankshaft angle 39 (abscissa). In the figure, first injection pattern 37 has here from left to right a first pilot injection 42, a second pilot injection 44 ("close pilot injection"), and a main injection 46.

An integral above injection rate 38 characterizes a particular injected fuel quantity 40 ("injection quantity") of the fuel, fuel quantity 40 being ascertained for each of partial injections 42, 44, and 46 individually or also for a sum of partial injections 42, 44, and 46. By converting crankshaft angle 39 using a rotational speed of internal combustion engine 10, a time integral may also be ascertained, thus allowing each particular injected fuel quantity 40 to be quantitatively ascertained.

Figure 4:
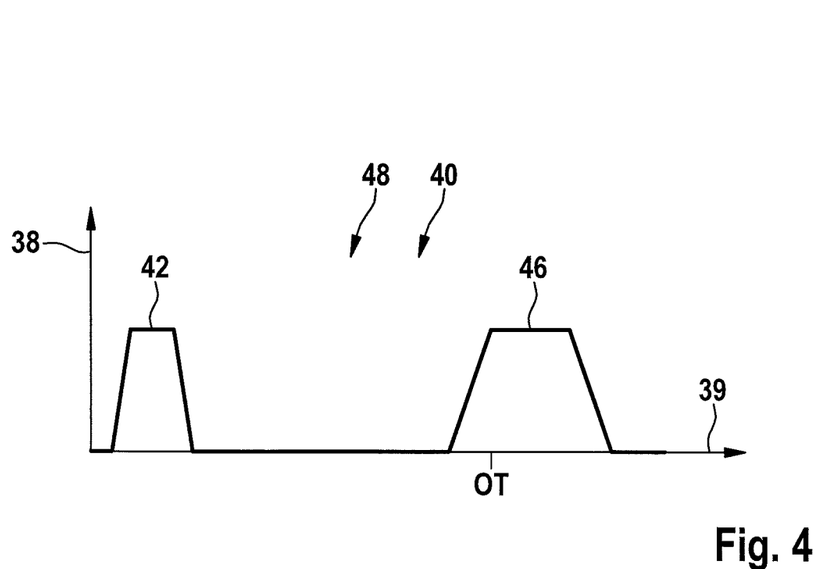
FIG. 4 shows a second fuel injection pattern.

Schematically similar to FIG. 3, FIG. 4 shows a second injection pattern 48 of fuel into combustion chamber 12. In contrast to FIG. 3, second injection pattern 48 of FIG. 4 has only first pilot injection 42 and main injection 46. Alternatively or additionally to second pilot injection 44, first and second injection patterns 37 and 48 may include a torque-neutral late post-injection. This is, however, not illustrated in FIGS. 3 and 4.

Figure 5:
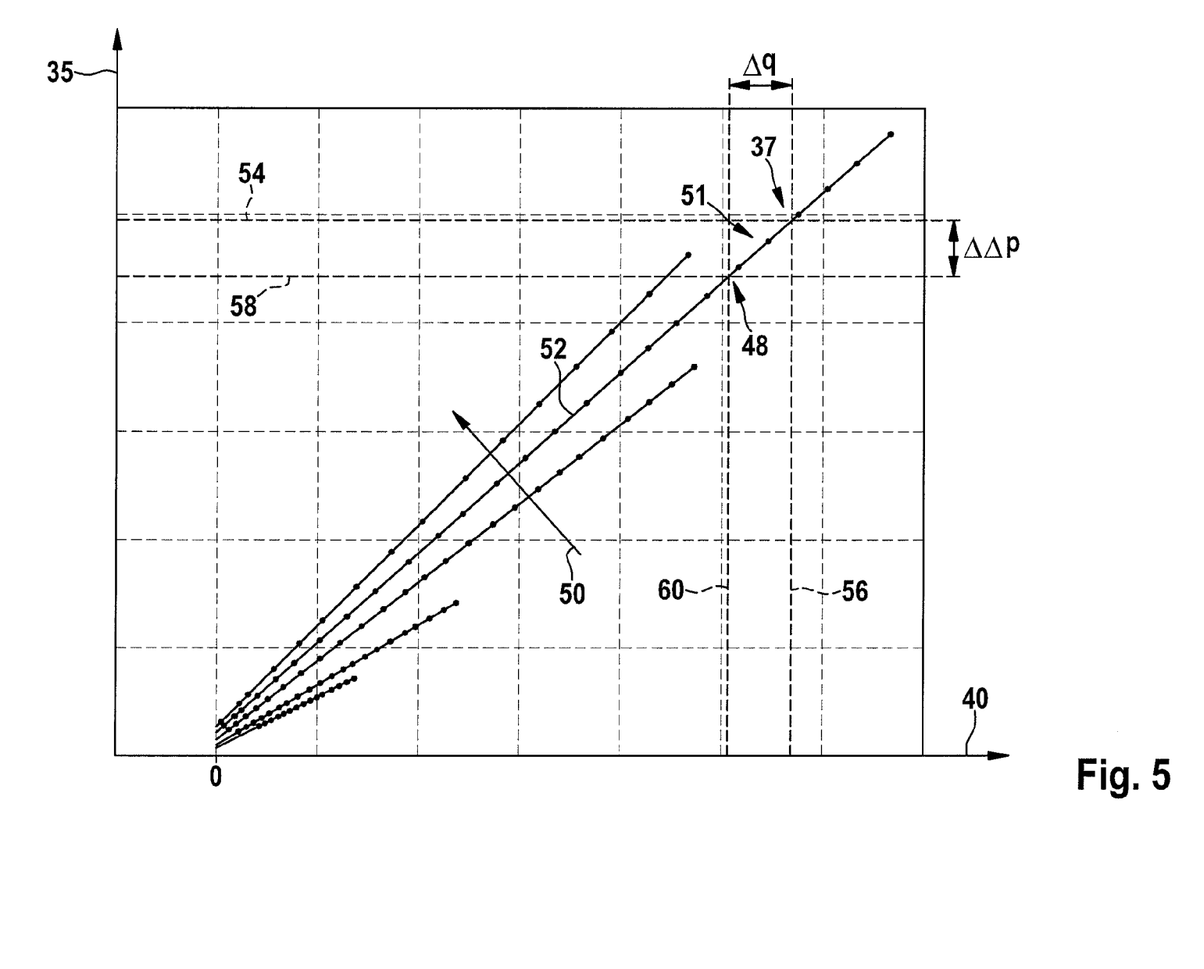
FIG. 5 shows a diagram having a pressure difference as a function of an injected fuel quantity.

FIG. 5 shows a diagram having five curves in the present case which characterize a connection of pressure difference 35 (ordinate) as a function of injected fuel quantity 40 (abscissa) and as a function of fuel pressure 19 (used as a parameter) in pressure accumulator 16. An arrow 50 points in the direction of a high fuel pressure 19. In the present case, fuel pressure 19 has values in a range of approximately 250 bar to approximately 1600 bar.

The diagram of FIG. 5 is preferably initially ascertained during a test operation and/or in a new condition of internal combustion engine 10 and/or in a new condition of pressure sensor 20 and stored in data memory 24 in the form of equations, tables, characteristic curves, characteristic maps and/or models. For this purpose, during the test operation of internal combustion engine 10, which is generally stationary and a torque generated by internal combustion engine 10 and a temperature of the fuel being presumed to be approximately constant, the injection of fuel is carried out alternatingly ("cyclically") by switching back and forth between first and second injection patterns 37 and 48. Preferably, this takes place in such a way that no or only a minor effect on the exhaust gas emission values and the operating noise of the internal combustion engine results at the same time.

Here, a curve family is ascertained similarly to FIG. 5 for a predefined number of fuel pressures 19 (parameters) in pressure accumulator 16. For this purpose, a connection between injected fuel quantity 40 and pressure difference 35 is ascertained punctiformly for each curve. By using first and second injection patterns 37 and 48, slopes 51 of the curves may be ascertained. This is explained in the following on an example of a section or of two points of a curve 52.

For this purpose, injection pattern 37 is used in a first step (see the associated arrow in the drawing of FIG. 5). A value 54 of pressure difference 35 and a value 56 of injected fuel quantity 40 correspond to first injection pattern 37 at fuel pressure 19 based on curve 52.

In a second step, injection pattern 48 is used (see also the associated arrow in the drawing). A value 58 of pressure difference 35 corresponds to second injection pattern 48, and a value 60 corresponds to injected fuel quantity 40. This may be used to indicate an equation (1):

$$\Delta\Delta p = \Delta p2 - \Delta p1, \text{ in which} \quad (1)$$

$\Delta p1$=value 54 of pressure difference 35;
$\Delta p2$=value 58 of pressure difference 35; and
$\Delta\Delta p$=difference between $\Delta p1$ and $\Delta p2$.

Accordingly, an equation (2) may be indicated for injected fuel quantity 40:

$$\Delta q = q2 - q1, \text{ in which} \quad (2)$$

q1=value 56 of injected fuel quantity 40;
q2=value 60 of injected fuel quantity 40; and
$\Delta q$=difference between q1 and q2.

It is understood that variables $\Delta\Delta p$ and $\Delta q$ may also be negative, if necessary, depending on the (arbitrary) selection of the indexes (1; 2). In the present case, injected fuel quantity 40 is not ascertained directly, but indirectly, e.g., by using an activation period of electromagnetic actuator 13. Preferably, this ascertainment of injected fuel quantity 40 takes place during the mentioned test operation and during normal operation (see FIG. 6) of internal combustion engine 10 in the same manner. Here, value 56 of injected fuel quantity 40 does not correspond to actually injected fuel quantity 40, since it is not exactly known. As a result, during the test operation and during normal operation of internal combustion engine 10, a so-called "desirable quantity" of control and/or regulating device 22, which characterizes an instantaneous setpoint value of fuel quantity 40 to be injected, is assumed for the injected fuel quantity.

Slope 51 according to a particular fuel pressure 19 ("rail pressure") may be indicated with the aid of an equation (3):

$$\Psi = \Delta\Delta p / \Delta q \rightarrow \Psi = KL(p), \text{ in which} \quad (3)$$

$\Psi$=particular slope 51;
KL="characteristic curve," i.e., a functional connection; and
p=fuel pressure 19 in pressure accumulator 16.

Characteristic curve KL therefore has as the input variable fuel pressure 19 ascertained by using a properly functioning pressure sensor 20. Preferably, the values of slope 51, which area function of fuel pressure 19, are stored in data memory 24 according to equation (4) in the form of a characteristic curve, which is inverse to equation (3):

$$p_{MESS} = KL^{-1}(\Psi), \text{ in which} \quad (4)$$

$p_{MESS}$=fuel pressure 19 ascertained by a properly functioning pressure sensor 20 during the test operation;
$KL^{-1}$=characteristic curve inverse to equation (3); and
$\Psi$=slope 51 ascertainable according to equations (1) through (3).

Additionally, a fuel temperature and/or a fuel type may, for example, be ascertained and also stored in data memory 24 as other parameters of the characteristic curve. The method according to the present invention, however, works in principle independently of the fuel temperature and the fuel type.

The characteristic curve ascertained in this way may be used at a later point in time (see FIG. 6) during a normal operating state of internal combustion engine 10 in order to infer a fuel pressure 19 present in pressure accumulator 16. A state of pressure sensor 20 may in particular be inferred therefrom, and thus its function and its accuracy may be monitored.

If necessary, multiple of the above-mentioned variables or parameters may be averaged with the aid of a time averaging and/or a family averaging.

The accuracy of the method can be thereby improved. Compare here averaged values 30 and 32 in FIG. 2, for example.

Figure 6:
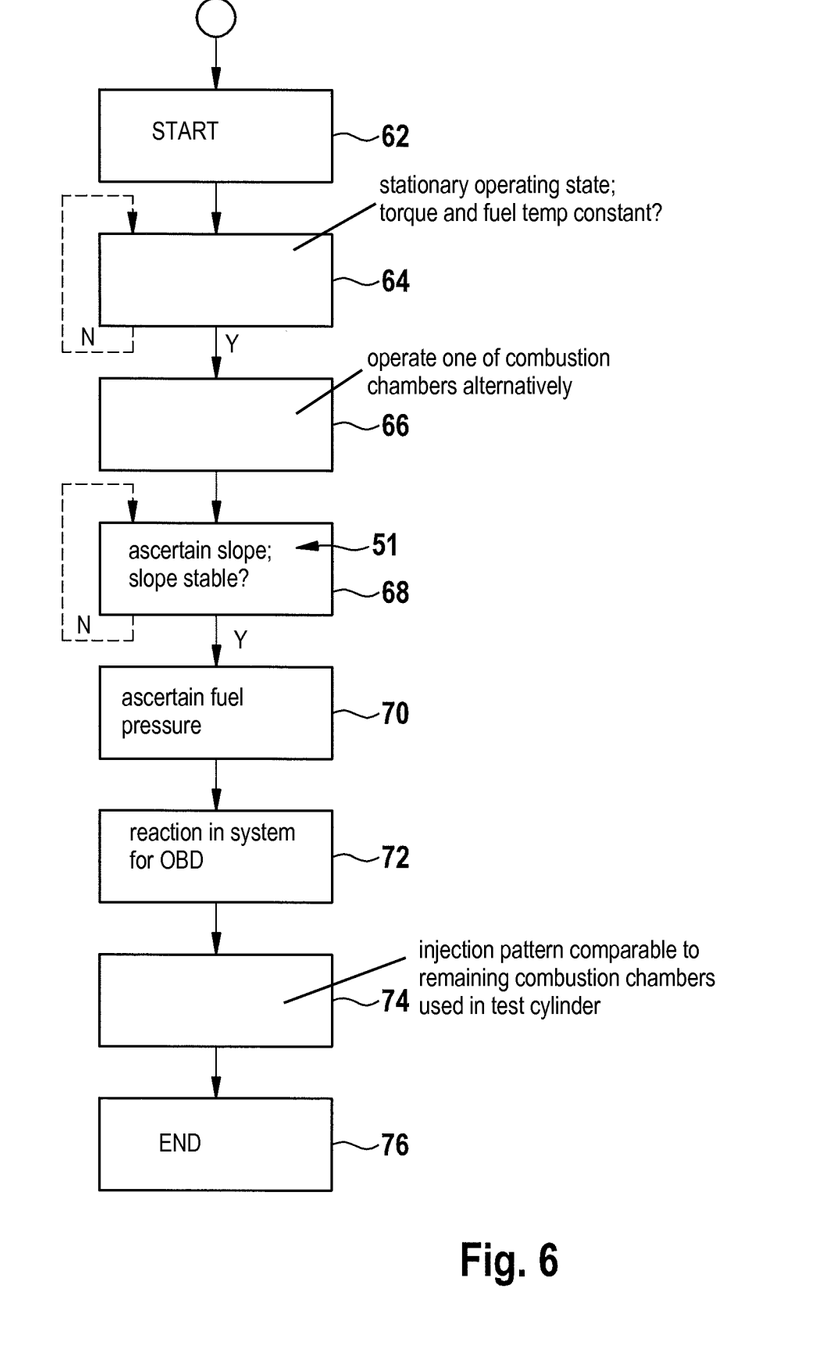
FIG. 6 shows a flow chart for operating the fuel system.

FIG. 6 is a flow chart to show the example method being carried out during normal operation of internal combustion engine 10, similarly to the above-described test operation. It is understood that the flow chart of FIG. 6 may also be applied to the above-described test operation, analogously and at least partially, and vice versa, that the above-described equations (1) through (4) may be applied analogously to carrying out the method during normal operation.

In a starting block 62, the procedure illustrated in FIG. 6 starts. Comparably to the further above-described test operation, it is checked in a following block 64 as to whether internal combustion engine 10 is operated in a stationary operating state and whether the torque generated by internal combustion engine 10 and the temperature of the fuel are approximately constant. If this is not the case, the procedure branches back to the beginning of the same block 64. Preferably, the operating state selected for the method during normal operation and the torque of internal combustion engine 10, as well as the temperature of the fuel, are comparable to the test operation described in FIG. 5.

Optionally, values or results ascertained in the meantime may be temporarily stored in data memory 24 and used at a later point in time at which a suitable comparable operating state is present again, when the stationary operating state cannot be maintained for a sufficiently long period of time. As a result, requirements, in particular for a duration of the stationary operating state, may be reduced, and thus the described method may be optimally used with regard to the present operating conditions.

In a subsequent block 66, one of combustion chambers 12 ("test cylinders") is operated alternatingly ("cyclically") using injection patterns 37 and 48 according to FIGS. 3 and 4. Remaining combustion chambers 12 are operated continuously using second injection pattern 48 according to FIG. 4. Since a larger fuel quantity 40 is injected into the test cylinder as a result of first injection pattern 37 in a chronologically averaged manner, injected fuel quantity 40 is accordingly reduced in remaining combustion chambers 12, so that injected fuel quantity 40 and thus the torque remain constant in the sum.

It is particularly advantageous for the method when the alternating use of first and second injection patterns 37 and 48 takes place in such an operating state of internal combustion engine 10 in which the smallest possible effect is present on the torque of internal combustion engine 10 or on the exhaust gas values of internal combustion engine 10. Moreover, the method is preferably only carried out in one single combustion chamber 12.

In a subsequent block 68, slope 51 is ascertained from values 54, 56, 58, and 60 according to the schematic view of FIG. 5. If slope 51 has a stable value, the procedure is continued in a subsequent block 70. If this is not the case, the procedure branches back to the beginning of the same block 68. Interferences with the electrical signals of fuel pressure sensor 20 or fluctuations of fuel pressure 19 due to possible pressure pulsations may be reduced, if necessary, with the aid of a time averaging and/or family averaging.

In block 70, a fuel pressure 19 in pressure accumulator 16 is ascertained ("computed") according to an equation (5) using the data stored during the above-described test operation:

$$p_{CALC} = KL^{-1}(\Psi), \text{ in which} \quad (5)$$

$p_{CALC}$=fuel pressure 19 "computed" during normal operation of internal combustion engine 10;
$KL^{-1}$=inverse characteristic curve as in equation (4); and
$\Psi$=slope 51 ascertained ("measured") with the aid of equations (1) through (3) during normal operation of internal combustion engine 10.

For this purpose, slope 51 used in the equation (5) is also used as an input variable in the equation (4) (or in the tables, characteristic curves, characteristic maps, and/or models stored in data memory 24), so that variable $p_{MESS}$ from equation (4) may be compared to variable $p_{CALC}$ from equation (5). This corresponds to an equation (6):

$$p_{ERR} = p_{MESS} - p_{CALC}, \text{ in which} \quad (6)$$

$p_{ERR}$=error of fuel pressure 19 or pressure sensor 20 ascertained by the comparison.

In a subsequent block 72, a reaction takes place, if necessary, in a system for a so-called on board diagnosis (OBD) as a function of ascertained error $p_{ERR}$. For example, an input takes place into an error memory, when an absolute value of $p_{ERR}$ exceeds a threshold value, after a sufficiently long debouncing time and/or a hint is communicated to the driver of the motor vehicle with the aid of a warning light or the like.

After carrying out the described method, an injection pattern 48, which is comparable to remaining combustion chambers 12, is also used in the test cylinder in a block 74 for the further normal operation of internal combustion engine 10. The method thus does not have an effect on the further normal operation of internal combustion engine 10 until the method for monitoring pressure sensor 20 is carried out again, if necessary, at a later point in time. In a subsequent ending block 76, the procedure illustrated in FIG. 6 ends.

In another specific embodiment of the method, it is possible for remaining—and after carrying out the method all—combustion chambers 12 to be operated using first injection pattern 37. An adaptation of fuel quantities 40 accordingly takes place during the method so that the torque is in turn constant in the sum.

In yet another specific embodiment, the method is carried out in a coasting mode of internal combustion engine 10. Here, a small fuel quantity 40 is injected alternatingly ("cyclically") into the test cylinder for a first number of working cycles of internal combustion engine 10 and then not for a second number of working cycles.

In yet another specific embodiment, one or multiple torque-neutral partial injections are input into the test cylinder for a first number of working cycles and then not for a second number of working cycles. This preferably takes place with the aid of a so-called "late post-injection" which takes place chronologically after main injection 46.

What is claimed is:

1. A method for operating a fuel injection system for an internal combustion engine in which pressurized fuel is made available in a pressure accumulator and a fuel pressure prevailing in the pressure accumulator is ascertained with the aid of a pressure sensor and in which the fuel enters a combustion chamber of the internal combustion engine through at least one fuel injection device, the method comprising:

ascertaining, via a control unit, a slope of a curve, which links a pressure difference in the pressure accumulator during a fuel injection to an injected fuel quantity, wherein the pressure difference and the injected fuel quantity are input to the control unit; and inferring, via the control unit, the fuel pressure prevailing in the pressure accumulator from the slope; and outputting, via the control unit, the inferred fuel pressure;

wherein to ascertain the slope, the fuel quantity injected by the fuel injection device is changed cyclically.

2. The method as recited in claim 1, wherein the injected fuel quantity is changed by a cyclic change in the injection pattern.

3. The method as recited in claim 2, wherein an injection pattern with a close pilot injection and an injection pattern without a close pilot injection are switched back and forth.

4. The method as recited in claim 2, wherein an injection pattern with a late post-injection and an injection pattern without a late post-injection are switched back and forth.

5. The method as recited in claim 1, wherein in a coasting mode of the internal combustion engine, an operating mode during which a comparably small injection quantity is injected, and an operating mode during which no injection takes place are switched back and forth.

6. A method for operating a fuel injection system for an internal combustion engine in which pressurized fuel is made available in a pressure accumulator and a fuel pressure prevailing in the pressure accumulator is ascertained with the aid of a pressure sensor and in which the fuel enters a combustion chamber of the internal combustion engine through at least one fuel injection device, the method comprising:

ascertaining, via a control unit, a slope of a curve, which links a pressure difference in the pressure accumulator during a fuel injection to an injected fuel quantity, wherein the pressure difference and the injected fuel quantity are input to the control unit; and inferring, via the control unit, the fuel pressure prevailing in the pressure accumulator from the slope; and outputting, via the control unit, the inferred fuel pressure;

wherein the injection quantity at a single combustion chamber is changed for ascertaining the slope, and a fuel quantity injected into the remaining combustion chambers of the internal combustion engine in each case is metered in such a way that a torque generated by the internal combustion engine is constant in the sum at least approximately.

7. The method as recited in claim 1, wherein at least one of a fuel temperature and a fuel type is considered when the pressure prevailing in the pressure accumulator is inferred from the slope.

8. The method as recited in claim 1, wherein a connection is ascertained between the slope of the curve, which links the pressure difference in the pressure accumulator during a fuel injection to the injected fuel quantity, at least one of: i) during a test operation, in a new condition of the internal combustion engine, and ii) in a new condition of the pressure sensor, and the connection is stored in the form of at least one of equations, tables, characteristic curves, characteristic maps, and models.

9. The method as recited in claim 1, wherein at least of a time averaging and a family averaging, of variables takes place when the method is carried out repeatedly in cycles.

10. A control or regulating device for an internal combustion engine, including a fuel injection system in which pressurized fuel is made available in a pressure accumulator and a fuel pressure prevailing in the pressure accumulator is ascertained with the aid of a pressure sensor and in which the fuel enters a combustion chamber of the internal combustion engine throughout at least one fuel injection device, comprising:

a control unit configured to perform the following:

ascertaining, via a control unit, a slope of a curve, which links a pressure difference in the pressure accumulator during a fuel injection to an injected fuel quantity, wherein the pressure difference and the injected fuel quantity are input to the control unit; and inferring, via the control unit, the fuel pressure prevailing in the pressure accumulator from the slope; and outputting, via the control unit, the inferred fuel pressure;

wherein to ascertain the slope, the fuel quantity injected by the fuel injection device is changed cyclically.

11. A computer-readable storage medium storing a computer program, which is executable by a processor, comprising:

a program code arrangement having program code operating a fuel injection system in which pressurized fuel is made available in a pressure accumulator and a fuel pressure prevailing in the pressure accumulator is ascertained with the aid of a pressure sensor and in which the fuel enters a combustion chamber of the internal combustion engine throughout at least one fuel injection device, by performing the following:

ascertaining, via a control unit, a slope of a curve, which links a pressure difference in the pressure accumulator during a fuel injection to an injected fuel quantity, wherein the pressure difference and the injected fuel quantity are input to the control unit; and inferring, via the control unit, the fuel pressure prevailing in the pressure accumulator from the slope; and outputting, via the control unit, the inferred fuel pressure;

wherein to ascertain the slope, the fuel quantity injected by the fuel injection device is changed cyclically.

12. A storage medium storing a computer program, the computer program, which is executable by a processor, comprising:

a program code arrangement having program code operating a fuel injection system in which pressurized fuel is made available in a pressure accumulator and a fuel pressure prevailing in the pressure accumulator is ascertained with the aid of a pressure sensor and in which the fuel enters a combustion chamber of the internal combustion engine throughout at least one fuel injection device, by performing the following:

ascertaining, via a control unit, a slope of a curve, which links a pressure difference in the pressure accumulator during a fuel injection to an injected fuel quantity, wherein the pressure difference and the injected fuel quantity are input to the control unit; and inferring, via the control unit, the fuel pressure prevailing in the pressure accumulator from the slope; and outputting, via the control unit, the inferred fuel pressure;

wherein to ascertain the slope, the fuel quantity injected by the fuel injection device is changed cyclically.

* * * * *